United States Patent Office 3,635,934
Patented Jan. 18, 1972

3,635,934
CRYSTALLINE 1,2-POLYBUTADIENE MOLDING COMPOSITION
Robert J. Schaffhauser, Brookside, and Charles D. Mason, Florham Park, N.J., assignors to Allied Chemical Corporation, New York, N.Y.
No Drawing. Filed June 12, 1969, Ser. No. 832,855
Int. Cl. C08d 5/02, 11/04, 13/28
U.S. Cl. 260—94.7 A                                  2 Claims

ABSTRACT OF THE DISCLOSURE

Crystalline 1,2-butadiene polymer is used together with a free-radical curing agent to produce a molding composition. The polybutadiene is in the normally granular, crystalline, largely syndiotactic form. When molding compositions of this polybutadiene are formulated on a roll mill, the compositions are granulated. Those formulated with peroxy curing agents will readily cure to a heat distortion temperature of at least 250° C. even when containing an antioxidant serving to inhibit premature curing. Conventional ingredients of molding compounds such as fillers and mold lubricants can be incorporated with the compositions. The compositions including a peroxy curing agent and an antioxidant can be worked without curing at temperatures above the fusion temperature, and cured at higher temperatures.

BACKGROUND OF THE INVENTION

This invention relates to improved curable molding compositions based upon butadiene polymers. The term "molding composition" or "molding compound" is used herein and in the appended claims in a broad sense, to include compression and transfer molding, encapsulation, coating, casting, etc.

Molding compositions from 1,2 - polybutadiene polymers and free-radical curing agents, particularly peroxy curing agents, are broadly known, in particular such compounds based on liquid 1,2-polybutadiene or liquid butadiene-styrene copolymers containing a high proportion such as about 80% by weight of butadiene ingredient, largely combined in the 1,2-form. See for example SPE Journal for March 1965, page 288. These prior art molding compounds are valuable for their high chemical resistance, thermal stability, chemical properties and electrical properties.

Crystalline 1,2-polybutadiene polymers are known in the art, for example crystalline syndiotactic 1,2-butadiene with at least 90% of the butadiene present in the 1,2 form is known from Montecatini British Pat. 835,752 published May 25, 1960. Also the crystalline isotactic form of 1,2-polybutdaiene is known from Montecatini British Pat. 854,615, published Nov. 23, 1960.

SUMMARY

This invention provides a practical 1,2-polybutadiene curable molding composition. In accordance with this invention, normally granular, crystalline 1,2-polybutadiene polymer is formulated with a free-radical curing agent into a molding composition. The use of crystalline polybutadiene makes formulation of molding compositions by dry blending procedures both feasible and attractive. Moreover the use of crystalline polybutadiene facilities granulation of a formulated composition as it comes in sheet form from a roll mill, making for easy handling compared to the handling of prior art gummy polybutadiene formulations prepared on a mill.

The term "molding compositions" is used herein and in the appended claims in a broad sense to include compositions usable in compression molding, transfer molding, encapsulation, coating, casting and like operations.

The term "polymer" is used herein in a broad sense to include not only homopolymers but also copolymers or interpolymers such as random copolymers, alternating copolymers, block copolymers and graft copolymers wherein the named constituent is the major proportion of the polymer.

Crystallinity of the butadiene polymer is verified by its normally granular condition; and can be demonstrated by X-ray examination.

In our invention we use butadiene polymer having molecular weights (determined from intrinsic viscosities) in the range of broadly 1,000–100,000. This range of molecular weights provides molding compositions, formulated with peroxy curing agents, having a fusion temperature of around 130° C. or below. Using polymers of molecular weight up to about 50,000 gives sufficient fluidity at about 120°–150° C. to fill an intricate mold in transfer molding operations.

To maintain these molecular weights without premature curing of the resin, it is desirable to include in the molding composition a polymerization inhibitor of the antioxidant type, such as a phenolic or amine antioxidant, e.g. an antioxidant based on a 6-t.-butyl-m-cresol derivative such as 4,4'-butylidene-bis(6-t-butyl-m-cresol); or a hindered polyphenol; or an antioxidant such as a secondary aromatic amine, e.g. N-phenylbeta-naphthylamine. Suitably such antioxidant is added to a slurry of the polymer such as formed in the polymerization reaction, to coat and thereby protect the polymer particles from the curing action of air. As above noted, our molding compositions containing a peroxy curing agent are fusible at say 120°–150° C.; and with curing agent of adequate stability they remain practically uncured at such temperatures, at least at moderate exposure times sufficient for blending, such as about 5–20 minutes, and when containing a small amount such as 0.1%–10% by weight of antioxidant. This behavior allows not only the preparation of blends, but also allows filling a mold by injection of melt; or coating an object with a melt of the molding composition, and thereafter curing by subjecting the composition to a temperature of at least 120° C. for sufficient time to effect a cure. A high level of cure can be obtained in a few minutes at say 160°–190° C.; the specific temperature required depends upon choice of curing agent and proportion thereof.

PREFERRED EMBODIMENTS

The examples which follow illustrate the best mode contemplated by us for carrying out our invention; but the invention is not to be understood as limited to the particular details of the examples. In each example the polybutadiene employed was crystalline and had about 90%–95% of the butadiene content thereof combined in the 1,2 form. The polybutadiene contained 0.3% by weight of antioxidant. It was prepared by Procedure (A) as follows:

Procedure (A)

A three neck flask equipped with a magnetic stirrer is purged free of air with dry nitrogen. To the flask is added 1.5 g. (0.0042 mole) of cobaltic acetylacetonate, followed by 2 ml. of butadiene liquefied at 0° C. To the catalyst is added 100 ml. of benzene. The mixture is stirred and maintained at a temperature of 17° C.–20° C.; whereupon 1.5 g. (0.0130 mole) of aluminum triethyl is added. After stirring for 30 minutes the contents of the flask are transferred under a purge of nitrogen to a loading device for attachment and charging to the reactor.

A second loader is charged with 2095 g. of butadiene and 2 ml. (0.0122 mole) of diethyl fumarate. Both loaders are attached to a clean dry one gallon glass lined autoclave which has been purged with nitrogen for 15 minutes. To the reactor is added 525 g. of butadiene. Stirring is started and cooling water is circulated around the reactor jacket until the temperature is 20° C.–25° C. The pressure is approximately 30 p.s.i.g. The catalyst solution is added by gravity from the other loader to the reactor. After 15 minutes, an additional 525 g. of butadiene is fed to the reactor. Addition is continued at 15 minute intervals until all the monomer has been added. The reaction is continued so that the total time is 4 hours.

At the end of this period the product is discharged through the bottom of the reactor into a second vessel equipped with a vent line for unreacted monomer. This vessel contains 2 liters of isopropyl alcohol and 50 ml. of hydrochloric acid. A nitrogen purge is attached to the reactor to pass through the bottom discharge line below the surface of the liquid in the lower vessel. The purge is conducted for 15 minutes. The product is filtered from the deactivation medium and transferred to a blender (Waring) containing 1.5 liters of isopropyl alcohol and 3.4 g. of a commercial hindered polyphenol antioxidant ("Irganox" 1076). The resin is blended for 15 minutes and filtered. It is transferred to trays and dried in a vacuum oven at 50° C. for 6 hours. There is obtained 680 g. of a white granular product. The resin has a reduced viscosity of 0.40 as measured at 1% conc. in decahydronaphthalene at 80° C., which corresponds to a molecular weight (M) of approximately 20,000 using the formula:

$$\text{Intrinsic viscosity} = 1.53 \times 10^{-4} M^{0.8}$$

(See Schildknecht "Vinyl and Related Polymers" (John Wiley & Sons, Inc., N.Y. 1952) pp. 30–31).

The curing agents of preferred embodiments are peroxy compounds having half-life of at least one minute at 130° C. Suitably the molding compositions will contain a filler such as glass fiber, asbestos, finely divided silica, clay, alumina, calcium carbonate, talc, powdered graphite or the like; and a mold lubricant such as calcium stearate or zinc stearate.

EXAMPLE 1

100 parts of 1,2-polybutadiene prepared by Procedure (A) above was blended by action of a mixing head, to apply shearing forces, with 2.5 parts of peroxy curing agent, specifically 2,5-dimethyl-2,5-bis(tertiary-butyl peroxy) hexyne-3, at a temperature of initially about 110° C. which rose to about 137° C. during about 20 minutes. This blend fused at about 128° C. Blending was continued for about another 20 minutes and the blend was then cooled. The cooled blend had a crumbly consistency which allowed ready conversion to granular form convenient for feeding to a conventional molding press.

The granular blend was charged into a mold cavity having a cover plate and designed to produce a plaque about one-eighth inch thick. The press was heated to 130° C. under pressure sufficient to hold the mold closed, for about 10 minutes, whereby the composition was fluxed and filled the cavity with some overflow. Then the temperature was raised to 175° C. and was maintained for one hour. The mold was cooled and the resulting plaque was removed.

From its original granular form, the composition had been converted to a very hard and glassy material, showing that a very high degree of cure had been achieved under the conditions employed.

EXAMPLE 2

This example illustrates the production of a molded plaque at a level of cure giving a heat distortion temperature, by ASTM Test D-648, of at least 250° C.

The samples, prepared for molding as in Example 1, were compression molded for 10 minutes at 190° C. The proportion of curing agent was 1.75 parts. The temperature used (190° C.) was that at which the curing agent has a half-life of one minute. This level of cure was found to result in heat distortion temperature of at least 250° C. and solvent take-up of 37% by weight when the sample was immersed in toluene for seven days at room temperature. Still higher degrees of cure are readily obtainable, to the point of zero change in weight, by 7 days' immersion in various reagents including 10% and 50% NaOH, 50% sulfuric acid, conc. nitric acid, glacial acetic acid, pyridine, methyl ethyl ketone, and xylene. Such high cures are obtained for example by use of 4 parts of peroxy compound and 175° C. for 30 minutes. Shore D hardness as high as 88 can be obtained.

EXAMPLE 3

This example illustrates production of a filled composition. A molding compound was formed by blending the following ingredients together with chloroform to a dough-like consistency, then air drying and milling on a roll mill for about five minutes at about 140° C.:

1,2-polybutadiene prepared by Procedure (A)—100 parts by weight;
Peroxy curing agent of Example 1–5 parts;
Hydrophobic electrical grade calcium carbonate powder, all particles below 8 microns diameter—330 parts;
Glass fibers (⅛ inch)—50 parts;
Vinyl silane (coupling agent for glass)—5 parts;
Diallyl isophthalate (cure promoter)—10 parts.

The resulting composition, which could be readily granulated, was supplied in granular form to the compression molding apparatus of Example 1. The composition was cured by compression molding for 10 minutes at 190° C.

The cured composition showed the following properties, initially and after oven heating in air, using standard tests:

PROPERTIES OF THERMOSET SAMPLE—ROOM TEMPERATURE

|  | Initial | 1 day at 200° C. | 20 days at 200° C. |
|---|---|---|---|
| Tensile modulus (p.s.i.) | 2.58×10⁵ | 2.50×10⁵ | 2.29×10⁵ |
| Ultimate tensile strength (p.s.i.) | 3,407 | 3,265 | 652 |
| Ultimate elongation (percent) | 2.3 | 1.7 | 0.3 |
| Flexural modulus (p.s.i.) | 6.2×10⁵ | 2.2×10⁵ | 6.6×10⁹ |
| Flexural strength (p.s.i.) | 6,574 | 7,704 | 2,655 |
| Arc resistance (section) | 188 | 186 | |
| Wet arc-track resistance (minutes) | 27 | | |
| Heat distortion temperature (by ASTM Test D-648) (° C.) | >240 | | |

Properties of thermoset sample at 200° C.

Tensile modulus (p.s.i.) ——————— 1.2×10⁵
Ultimate tensile strength (p.s.i.) ——— 950
Ultimate elongation (percent) ——— 0.9
Flexural modulus (p.s.i.) ——————— 3.9×10⁵
Flexural strength (p.s.i.) ——————— 2805

EXAMPLE 4

A roll mill was heated until the front roll was 250° F. and the back roll was 100° F. Then 20 parts of polybutadiene prepared by Procedure (A) above was added gradually with a narrow setting of the separation ("nip") between the rolls until the resin sheeted on the hot roll. Then a mixture of 80 parts of finely divided silica filler, 0.2 part of zinc stearate and 0.2 part of vinyl silane (glass coupling agent) was added during 5 minutes. Finally 3 parts of di-alpha-cumyl peroxide was gradually added over the full extent of the nip. Milling was continued for an additional 5 minutes; then the composition was sheeted off, rolled up and passed in rolled up form endwise between the slightly separated rolls. This operation of passing the rolled up stock between the rolls was repeated 15 to 20 times. Finally the composition was sheeted from the mill, cooled and reduced in commercial equipment to a granular powder.

This composition was compression molded under less severe conditions than used in Example 3 above, viz. at about 150° C. for about 1 minute. The product had heat distortion temperature (by ASTM Test D-648 of at least 250° C.

EXAMPLE 5

Ingredients:
- 20 parts crystalline 1,2-polybutadiene
- 80 parts calcium carbonate
- 3 parts di-alpha-cumyl peroxide
- 5 parts glass fiber filler (⅛ inch)
- 0.5 part vinyl silane coupling agent Add above ingredients to a conventional ball mill and mix for 10 minutes.

The resulting dry blended composition is sufficiently homogeneous for use in molding, particularly in applications in which shear forces are applied as in injection or transfer molding.

We claim:

1. Process of molding a butadiene polymer, comprising forming a molding composition by blending, in the fused state, a 1,2-polybutadiene polymer and a peroxy compound, at temperature not above 150° C., said butadiene polymer being normally granular and crystalline, having a molecular weight in the range of 1,000 to 100,000, and containing about 0.1%–10% of antioxidant, said peroxy compound having a half-life at 130° C. of at least one minute, and thereafter subjecting the resulting blend to a temperature of at least 150° C. for a time sufficient to cure the composition to heat distortion temperature of at least 250° C.

2. Process of claim 1 wherein said butadiene polymer is syndiotactic 1,2-polybutadiene.

References Cited

UNITED STATES PATENTS

| | | | |
|---|---|---|---|
| 3,129,204 | 4/1964 | Gilmont | 269—94.7 O X |
| 3,214,422 | 10/1965 | Mageli et al. | 269—94.9 |
| 3,449,191 | 6/1969 | Taylor | 269—94.9 X |
| 3,137,683 | 6/1964 | Natta et al. | 260—94.2 |
| 3,436,371 | 4/1969 | Ware | 260—94.7 X |

FOREIGN PATENTS

| | | | |
|---|---|---|---|
| 835,752 | 5/1960 | Great Britain | 260—94.3 |
| 854,615 | 11/1960 | Great Britain | 260—94.3 |

JOSEPH L. SCHOFER, Primary Examiner

W. HAMROCK, Assistant Examiner

U.S. Cl. X.R.

260—96 R; 264—328